US007002958B1

(12) United States Patent
Basturk et al.

(10) Patent No.: US 7,002,958 B1
(45) Date of Patent: Feb. 21, 2006

(54) METHOD FOR LOAD-BALANCING WITH FIFO GUARANTEES IN MULTIPATH NETWORKS

(75) Inventors: Erok Basturk, Cupertino, CA (US); Vadim Antonov, Belmont, CA (US)

(73) Assignee: Pluris, Inc., Cupertino, CA (US)

( * ) Notice: Subject to any disclaimer, the term of this patent is extended or adjusted under 35 U.S.C. 154(b) by 0 days.

(21) Appl. No.: 09/393,768

(22) Filed: Sep. 10, 1999

(51) Int. Cl.
H04L 12/56 (2006.01)
(52) U.S. Cl. ...................................... 370/392
(58) Field of Classification Search .............. 370/229, 370/230, 231, 235, 351, 352, 355, 356, 357, 370/389, 395.1, 396, 397, 399, 395.3, 395.31, 370/395.32, 395.52, 400, 408, 409
See application file for complete search history.

(56) References Cited

U.S. PATENT DOCUMENTS

| 5,610,904 | A | * | 3/1997 | Eng et al. ................... 370/408 |
| 5,701,416 | A | * | 12/1997 | Thorson et al. ............... 712/11 |
| 5,825,772 | A | * | 10/1998 | Dobbins et al. ............ 370/396 |
| 6,081,506 | A | * | 6/2000 | Buyukkoc et al. .......... 370/235 |
| 6,101,181 | A | * | 8/2000 | Passint et al. .............. 370/352 |
| 6,148,000 | A | * | 11/2000 | Feldman et al. ............ 370/397 |
| 6,321,271 | B1 | * | 11/2001 | Kodialam et al. .......... 709/241 |
| 6,363,319 | B1 | * | 3/2002 | Hsu ........................... 701/202 |
| 6,512,766 | B1 | * | 1/2003 | Wilford ...................... 370/389 |

OTHER PUBLICATIONS

Cohen et al. "The Sink Tree Paradigm: Connectionless Traffic Support on ATM LAN's". IEEE/ACM Transactions on Networking. Jun. 1996. pp. 363-374.*
Ogier et al. "Minimum-expected-delay Alternate Routing", IEEE Eleventh Annual Joint Conference of the IEEE Computer and Communications. May 4-8, 1992, pp. 617-625.*
Viswanatan et al. "Evolution of Multiprotocol Label Switching". IEEE Communications Magazine. May 1998. pp. 165-173.*
W.T. Zaumen et al., "Loop-Free Multipath Routing Using Generalized Diffusing Computations", Proc. IEEE Infocom 98, San Francisco, California, Mar./Apr. 1998.
H. Adiseshu et al., "Reliable FIFO Load Balancing over Multiple FIFO Channels", Department of Computer Science, Washington University, May 3, 1995.
J. Chen et al., "An Efficient Multipath Forwarding Method", Proc. IEEE Infocom 98, San Francisco, California, Mar./Apr. 1998.
K. Bolding et al., "The Case for Chaotic Adaptive Routing", Technical Report CSE-94-02-04, University of Washington, Feb. 1994.
H. Adiseshu et al., "A reliable and Scalable Striping Protocol", ACM Computer Communication Review, vol. 26, pp. 131-141, Oct. 1996.
C. Villamizar, "OSPF Optimized Multipath (OSPF-OMP)", Internet Draft, draft-jetf-ospf-omp-02, Internet Engineering Task Force, Feb. 1999.

* cited by examiner

*Primary Examiner*—Chi Pham
*Assistant Examiner*—Derrick W Ferris
(74) *Attorney, Agent, or Firm*—Donald R. Boys; Central Coast Patent Agency, Inc.

(57) ABSTRACT

A method for routing packets in a multipath network of nodes balances the loading of system resources while guaranteeing a FIFO network (i.e., First In First Out). Acyclic directed graphs based on local network information are used at each node with routing bias tables that allow for local preferences. A randomizing function may be used throughout the network to allow uniform utilization of system resources. A normalizing function may be used throughout the network to reduce bit operations in routing packets.

23 Claims, 2 Drawing Sheets

US 7,002,958 B1

METHOD FOR LOAD-BALANCING WITH FIFO GUARANTEES IN MULTIPATH NETWORKS

BACKGROUND OF THE INVENTION

1. Field of Invention

The present invention relates to a method for routing packets in a network and more particularly to a method for routing packets in a multipath network in a way that improves load-balancing with FIFO guarantees.

2. Description of Related Art

In an information network, packets of data must be routed from an entry point in the network to a destination point. The sequential ordering of packets belonging to the same flow generally must be preserved so that a FIFO condition is guaranteed (i.e., First In First Out). This requirement is most easily satisfied with a simple network topology, that is, a network where there are relatively few choices for routing packets from an entry point to a destination point, because it is not so critical to develop strategies for balancing the loads on network resources. On the other hand, the development of increasingly complex, multi-connected networks has led to problems associated with satisfying the FIFO condition while simultaneously balancing loads in a multipath network.

A network can be modeled as a directed graph G(V,E) consisting of a set V of nodes $\{n_i\}$ and a set E of directed links $\{e_j^i\}$ between those nodes (i.e., $e_j^i$ is the directed link from node i to node j.). For each node i, let $E^i$ be the set of directed links that connect from node i to another node of the network. FIG. 2 presents a simple but illustrative hypercube model of a network with nodes numbered from 0 to 7. In FIG. 2, the directed links from node 0 are given by $$E^0 = \{(e_1^0, e_2^0, e_4^0)\}.$$

Subsets of directed graph G=G (V, E) can be used to define directed graphs that model the routing of packets. Let $\{G_j\}$ be a set of directed graphs, where each $G_j$ is a subset of G (i.e., $G_j \subseteq G$) so that the nodes and directed links of $G_j$ also belong to G. For node i and directed graph $G_j$, let $S_j^i = (E^i \cap G_j)$ be the subset of $G_j$ corresponding to links leaving node $n_i$. The indexing of $\{G_j\}$ may be done, for example, by destination node. Then, in FIG. 2, for the directed graph $G_5$ with directed links $\{e_1^0, e_4^0, e_5^1, e_5^4\}$, it follows that $S_5^0 = \{e_1^0, e_4^0\}$.

In routing packets in the network defined by G and $\{G_j\}$, each packet entering the network at any given node i, can be marked with an index j, identifying a directed graph $G_j$. This index yields a successor set $S_j^i$ according to the definition above. An element of $S_j^i$ can be chosen according to some strategy, thereby specifying a particular link so that the packet can be forwarded to another node of V in the network. Using the same index j, a similar action can be performed at this node and subsequently until the routing process is terminated. The routing of a packet can be terminated, for example, if the successor set is empty at some node. A node where the successor set is empty is designated as a destination node for the directed graph $G_j$ or for a packet that is being routed to this node. Other external conditions may be used to terminate the routing of a packet. For example, setting a maximum number of nodes that can be visited by a packet (often referred to as the maximum hop count) can be used in order to limit the routing of a packet when a directed graph presents inescapable cycles (i.e., the packet can never reach a node with an empty successor set).

Approaches to the routing of packets typically either utilize local network information or global network information at each node for the purpose of computing routing tables that are equivalent to the successor sets defined above. Methods requiring global network information use extensive knowledge of network topology at each node. Examples include the link state or topology broadcast algorithms. These algorithms become increasingly burdensome as the complexity of the network increases. Methods requiring local network information use only limited knowledge of network topology at each node.

Preferably, the routing tables collectively satisfy an acyclic property, whereby circular paths are eliminated in the routing of packets. In a network were one wishes to establish directed acyclic graphs for sets of destinations, one can use algorithms such as the distance vector algorithms developed in "Loop-free Multipath Routing Using Generalized Diffusing Computations", W. T. Zaumen and J. J. Garcia-Luna-Aceves, Proc. IEEE INFOCOM 98, San Francisco, Calif., Mar. 29–Apr. 2, 1998. These algorithms define routing tables that satisfy an acyclic property so that routing paths are loop-free (i.e., no circular paths). Other approaches may lead to routing tables with undesirable loops so that paths may be cyclic. Nevertheless, many practically useful routing tables do contain transient loops due to the nature of the computation. Ideally these algorithms generate routing tables that are optimal in the sense that the routing tables prescribe paths with routing distances that are minimized; however that may not be possible in some applications, particularly when the network includes nodes that utilize different algorithms for generating routing tables.

But even with the availability of optimal loop-free routing tables, problems associated with unbalanced loading remain unresolved. As the complexity of a network increases, the problems become more severe because of the potential for more extreme imbalance.

SUMMARY OF THE INVENTION

Accordingly, it is an object of this invention to provide a method for routing packets in a multipath network.

It is a further object of this invention to provide a method for routing packets in a multipath network in a way that improves load balancing with FIFO guarantees.

It is a further object of this invention to provide a method for routing packets in a multipath network in a way that uses randomizing techniques to balance loads in the system.

It is a further object of this invention to provide a method for routing packets in a multipath network in a way that reduces bit operations required for routing.

It is a further object of this invention to provide a method for routing packets in a multipath network in a way that uses local preferences to balance loads in the system.

The above and related objects of the present invention are realized by a method for routing packets in a multipath network of nodes, where each packet has a routing in the network determined by a directed-graph index, including: accessing a tag of a packet at a first node; determining a second node by using the tag to access a routing bias table; calculating an updated tag from the tag; replacing the tag of the packet with the updated tag to give an updated packet; and routing the updated packet from the first node to the second node.

Determining a second node may include accessing a directed-graph index of the packet at the first node, calcu lating a normalized tag from the tag, and determining an element of a successor set by using the normalized tag to access the routing bias table. The routing bias table may be selected from a plurality of routing bias tables indexed by a first router and a directed-graph index. Preferably, the routing bias tables satisfy an acyclic property so that no loops are possible in the network. The normalized tag may be designed to limit bit operations in accessing the routing bias table. The routing bias table also may be designed to create local preferences in routing. Determining an updated tag may include a randomizing operation designed to balance loads in the routing process.

The method has a number of desirable advantages. Packets are routed in a multipath network in a way that balances loads in the network by a randomizing operation. The number of bit operations required in this process can be desirably limited. Further the load balancing can be tuned by the introduction of local preferences in the routing operation. Further, the method guarantees the FIFO condition in the routing of packets so the arrival sequence of two packets from a common flow in the network is equivalent to the departure sequence of the two packets from the network.

These and other objects and advantages of the invention will become more apparent and more readily appreciated from the following detailed description of the presently preferred exemplary embodiment of the invention taken in conjunction with the accompanying drawings.

DETAILED DESCRIPTION OF THE PRESENTLY PREFERRED EXEMPLARY EMBODIMENTS

Figure 1:
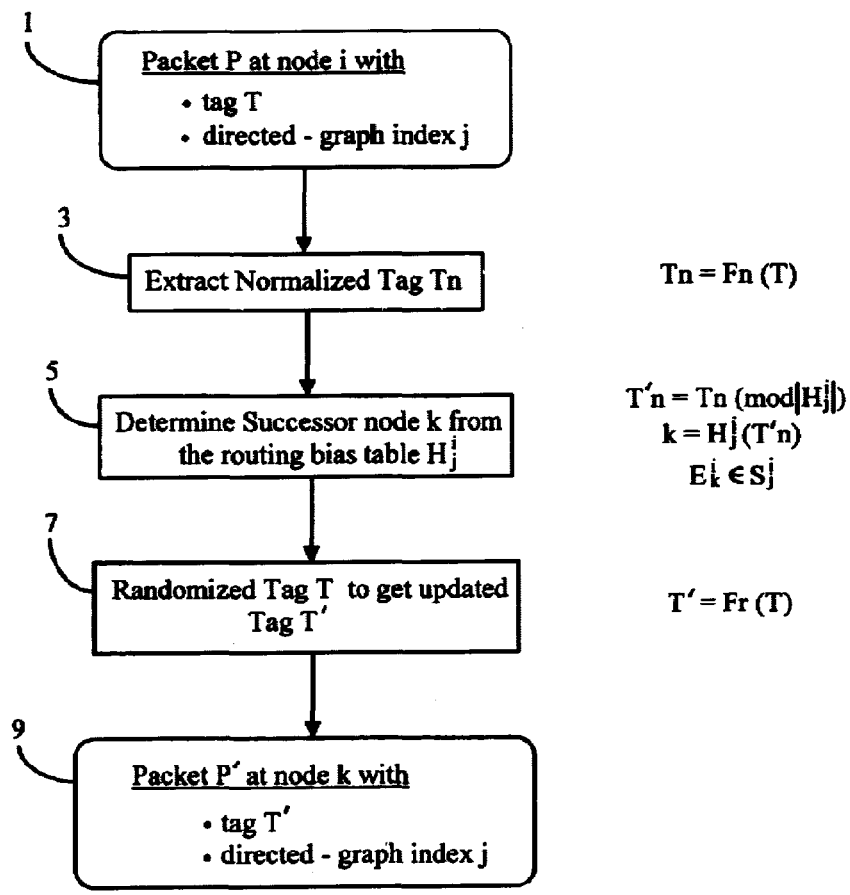
FIG. 1 is a flow diagram corresponding to a preferred embodiment of the present invention.
Figure 2:
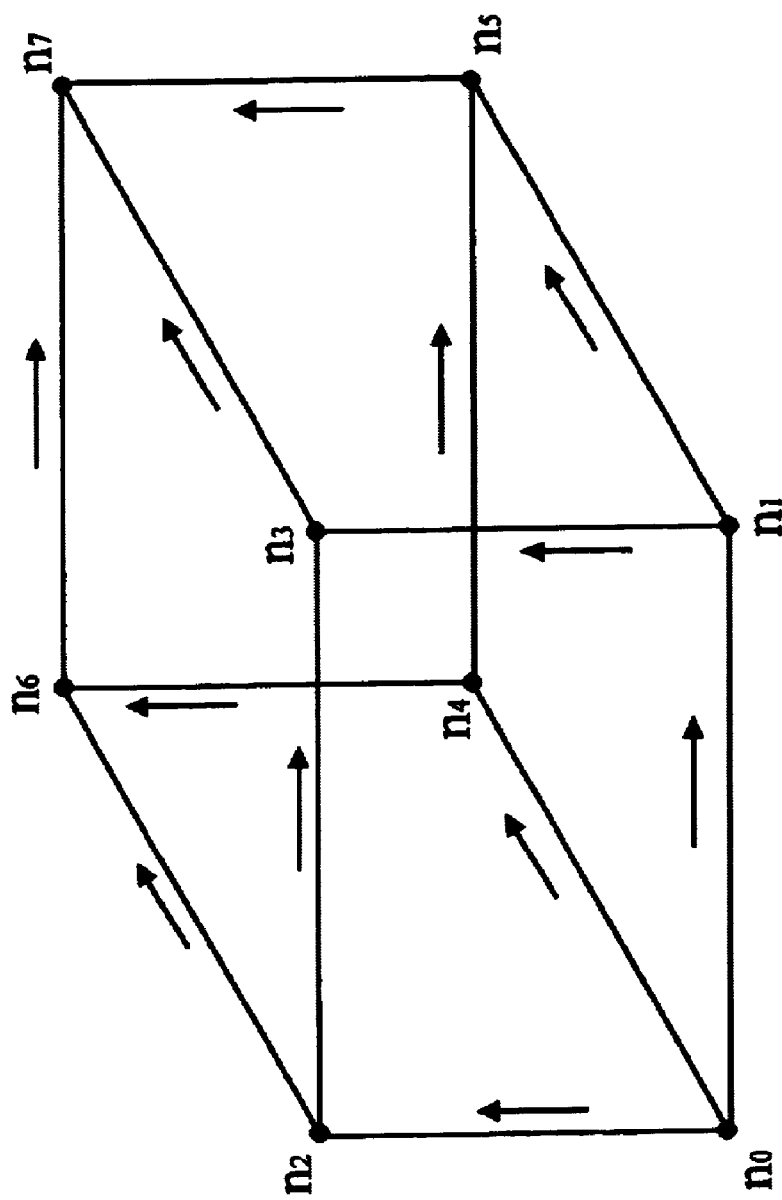
FIG. 2 is network with a hypercube topology.

As shown in FIG. 1, a preferred embodiment of a method for routing packets in a multipath network according to the present invention can be described in terms of the routing of an item of data 1, which includes a packet P having a tag T, from a node i to a successor node k as part of the routing of packet P over a directed graph $G_j$. A packet generally includes a set of accessible information bits, where some bits are used to identify the index j that identifies a given directed graph and some bits are used as a tag in the routing process. A routing operation as illustrated in FIG. 1 includes the transfer of packet P currently at node i to successor node k. At an extraction step 3, a normalized tag TN is calculated from the tag T by means of a normalizing function:

$$T_N = f_N(T).$$

The normalizing function $f_N$ can be used to reduce the number of bits involved in the routing table operations. Normalized tag $T_N$ may represent a number of least significant bits of T; however, the number of bits retained must be sufficient for routing packets relative to the complexity of the network. For example, a tag of n bits defines at most $2^n$ distinct routing options for a packet being routed from a given node. Although different normalizing functions may be used at each node, the implementation of the method is simpler when the same function is used at all nodes in the network.

At a determination step 5, successor node k is determined from a successor set $S_j^i$ by using $T_N$ to modularly access a routing bias table $H_j^i$, which has $|H_j^i|$ entries:

$$T'_N = T_N (\mathrm{mod}\, |H_j^i|)$$

$$k = H_j^i(T'_N)$$

$$e_k^i \in S_j^i.$$

That is, for current node i and index j, successor set $S_j^i$ includes directed links corresponding to the possible successor nodes of $G_j$ at node i from which node k will be chosen. Routing bias table $H_j^i$ includes $|H_j^i|$ entries, each of which corresponds to some element of successor set $S_j^i$. The value of $T'_N$ is determined by a modular operation so that $T'_N$ can be used to access a value in the routing bias table $H_j^i$. Preferably, the successor sets are collectively defined to satisfy the acyclic property discussed above so that the network contains no cyclic paths. That is, for each index j the directed graph $G_j$ defines an acyclic directed graph.

Routing bias table $H_j^i$ allows biasing for local preferences in successor set $S_j^i$. For example, if each entry in routing bias table $H_j^i$ is assumed to be equally likely, then an unbiased routing index simply consists of an enumeration of indices corresponding to the elements of $S_j^i$; that is, each element of the successor set is equally likely. By increasing the number of entries in $H_j^i$ to include multiple entries for preferred routers, the performance of the system can be tuned when some routers are underutilized.

At a randomizing step 7, an updated tag T' is calculated from tag T by means of a randomizing function:

$$T' = f_R(T).$$

The randomizing function $f_R$ can be used to increase the likelihood that all routing resources are used in the network. For example, the randomizing function may be designed so that all routing options are nearly equally likely. Preferred choices include a hash function such as an LFSR or a function based on linear cellular automata. Although different randomizing functions may be used at each node, the implementation of the method is simpler when the same function is used at all nodes in the network.

An updated item of data 9 results then from replacing tag T in packet P with updated tag T' to give an updated packet P', which is then routed to node k. Packet P' maintains the direct-graph index j.

In operation, the routing operation illustrated in FIG. 1 is carried out at all nodes in the network, which may include host nodes as well as router nodes. These operations may be carried out asynchronously between nodes although each node and link in the network must carry traffic locally in a FIFO ordering (i.e., First In First Out).

Various approaches are possible for initializing the routing operation illustrated in FIG. 1. For example, in FIG. 1 node i may be the entry node in the network for packet P. According to a preferred embodiment for initializing tag T at entry node i, a prescribed number of fields that determine the corresponding flow are accessed. Fields used to identify a flow may include, for example, the entry node, the directed-graph index, protocol type, entry port, and destination port. These fields are then concatenated into a bit string. A hash function is then applied to this bit string, the result of which is another bit string, typically of shorter length, representing a digest of the original bit string. Out of this digest or hash, a subset of bits is extracted to constitute the initial tag. An example of a suitable hash/digest function is an LFSR that is generated by a polynomial of equal or larger degree than the desired length of the tag so that the result can be truncated to fit into the desired tag length.

The present invention possesses a number of distinct advantages.

The use of successor sets as described above relies only on partial information regarding the complex topology of the multipath directed graph over which the packet is being routed.

That is, at each node i only local knowledge is required (i.e., $S_j^i$ for all j in the network). Use of the successor sets $S_j^i$ according to the present invention guarantees a FIFO property for the network, whereby the sequential ordering of the packets of a flow is preserved in the routing of the packets from an entry node of the network to a destination node. The use of tags according to the present invention guarantees this result by using a common tag for packets in a common flow. That is, if two packets enter the network at a node i with identical tags and with an identical directed graph index j, then they will arrive at a destination node of $G_j$ in the order in which they arrived at entry node i.

The use of randomizing function $f_R$ allows one to vary paths in the network in order to fully utilize the network resources (i.e, to use in theory all available paths). The assignment of tag T to packet P at node i with index j results in a unique path from node i to a destination node of $G_j$. By use of an appropriate randomizing function $f_R$ and an appropriate normalizing function $f_N$, varying the tag allows one to utilize more fully the resources of the system. That is, an approximately uniform distribution over the possible values for tag T can result in an approximately uniform distribution over the possible paths from node i to node j.

Even with such a mechanism in place for the randomization of paths in the network, it may be desirable to create local preferences for the routing of packets. By defining a routing bias table $H_j^i$ at any node i, one can allow some elements of $S_j^i$ to be referenced multiple times, thereby giving preference to certain paths in the directed graph $D_j$. This biasing may be desirable, for example, if some node in the network is measurably overused or underused. Additionally this biasing may be desirable if some nodes or links represent greater or lesser capacity as compared with other nodes or links in the network.

According to the preferred embodiment described above, the randomizing function $f_R$ and the normalizing function $f_n$ can be used throughout the network and need not require any specialized configuration. This design makes these functions suitable for implementation in hardware and deployment in large networks. Alternatively the definition of these functions can vary from node to node as long as the definitions are static, that is, time invariant.

Varying system parameters including $f_N$, $f_R$, $S_j^i$, and $H_j^i$, may be necessary under some circumstances such as the changing availability of a node. However, the FIFO property described above may be lost for two packets in transit when such a change occurs.

The use of the invention is particularly advantageous in large, richly connected networks that use routing protocols offering a large number of paths with only a limited knowledge of the network topology known at each node. However, the invention may be applied to any data network where one or multiple paths exist and where there is a need to guarantee FIFO ordering between certain groups of packets.

The use of randomizing techniques to balance loads in traffic flows over a directed graph can have additional advantages when the directed graph is not acyclic. In a typical network, the desirable termination condition is for a packet is to arrive at a node where there are no more successors. Such a node is often described as a destination node for the packet, or one of its exit points from the network. In a network where cycles may be present, the use of a randomizing function such as $f_R$ increases the likelihood that a packet will not cycle interminably so long as there exists at least one path in the directed graph from a node holding a packet to a node with an empty successor set.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A method for routing packets in a multipath network of nodes, each packet having a routing in the network determined by a directed-graph index, comprising;
accessing a tag and a directed-graph index from the packet at a first node;
producing a normalized tag from the accessed tag by applying a normalizing function to the tag, the normalizing function used substantially throughout the network;
determining a second node of a successor set of nodes by using the normalized tag and directed-graph index to access a routing bias table;
replacing the tag of the packet with a randomized tag to give an updated packet; and
routing the updated packet from the first node to the second node;
wherein the directed-graph index determines at least one destination node, and the routing bias table is selected from a plurality of routing bias tables indexed by the first node and the directed-graph index, and the routing bias tables satisfy an acyclic property, and the normalizing function enhances network performance by reducing the number of bits involved in accessing the routing table bias table, and the randomized tag arbitrarily varies paths in the network in order to fully utilize the network resources.

2. The method of claim 1, wherein the second node is a destination node.

3. The method of claim 1 further comprising:
accessing a tag of the updated packet at the second node;
determining a third node by using the tag of the updated packet to access a second routing bias table;
calculating a second updated tag from the tag of the updated packet;
replacing the tag of the updated packet with the second updated tag to give a second updated packet; and
routing the second updated packet from the second node to the third node.

4. The method of claim 3 wherein the third node is a destination node.

5. The method of claim 1, wherein the normalized tag includes evaluating an updating function that is used substantially throughout the network.

6. The method of claim 5, wherein the updating function enhances network performance by randomizing packet routings.

7. The method of claim 6, wherein the routing bias table enhances network performance by allowing local preferences for routings.

8. The method of claim 1, wherein,
for two packets having a common entry node, a common directed graph index, and a common entry tag at the common entry node, an arrival sequence of the two packets at the common entry node is equivalent to an arrival sequence of the two packets at a common destination node;

the common entry node defines an identical entry for the two packets into the network;

the common destination node defies an identical destination for the two packets in the network; and the common entry tag at the common entry node defines an identical tag provided to each of the two packets before arrival at the common entry node.

9. The method of claim 1, wherein, for two packets having a common entry node, a common directed-graph-index, and a common entry tag at the common entry node, an arrival sequence of the two packets at the common entry node is equivalent to an arrival sequence of the two packets at an intermediate node;

the common entry node defines an identical entry for the two packets into the network;

the common directed-graph index defines an identical routing for the two packets in the network; and the common entry tag and the common entry node defines an identical tag provided to each of the two packets before arrival at the common entry node.

10. The method of claim 9, wherein, the common entry tag is calculated by operation of a hash function on a selection of bits belonging to either of the two packets.

11. A method for routing flows in a multipath network of nodes, each flow including a sequence of packets, each flow having a flow entry node and a flow directed-graph index, and each packet including a tag having a plurality of bits included in the packet, comprising:

marking packets belonging to a flow with a flow entry tag before entry into the network at a flow entry node; and changing tags of packets in the network by accessing the tag and a directed-graph index from the packet at a first node, producing a normalized tag from the accessed tag and replacing the tag of the packet with a randomized tag to give an updated packet, so that the packets of a flow receive an identical tag when being routed to an identical node;

wherein, producing a normalized tag from the tag is accomplished by applying a normalizing function to the tag, and determining a second node of a successor set of nodes is accomplished by using the normalized tag and a directed-graph index to access the first routing bias table, and the normalizing function enhances network performance by limiting bit operations in accessing the routing table bias table and the randomized tag arbitrarily varies paths in the network in order to fully utilize the network resources.

12. The method of claim 11, wherein the routing bias tables are indexed by a first node and a directed-graph index; and the routing bias tables are indexed by a first node and a directed-graph index; and the routing bias tables satisfy an acyclic property.

13. The method of claim 11, wherein producing a normalized tag includes:

evaluating a normalizing function that is used substantially throughout the networks.

14. The method of claim 11, wherein producing a normalized tag includes evaluating an updating function that is used substantially throughout the network.

15. The method of claim 14, wherein the updating function enhances network performance by randomizing packet routings.

16. The method of claim 15, wherein the routing bias table enhances network performance by allowing local preferences for routings.

17. The method of claim 11, wherein calculating an updated tag includes evaluating an updating function that is used substantially throughout the network.

18. The method of claim 17, wherein the updating function enhances network performance by randomizing packet routings.

19. The method of claim 18, wherein the routing bias table enhances network performance by allowing local preferences for routings.

20. The method of claim 19, wherein the arrival sequence of two packets of a given flow at the common entry node is equivalent to an arrival sequence of the two packets at an intermediate node of the given flow.

21. The method of claim 11, wherein an arrival sequence of two packets at a given flow at the common entry node of the given flow is equivalent to an arrival sequence of the two packets at an intermediate node of the given flow.

22. The method of claim 11, wherein the directed-graph index determines at least one destination node.

23. The method of claim 11, wherein:

the flow entry tag of a flow is calculated by operation of a hash function on a selection of bits belonging to a packet of the flow.

* * * * *

UNITED STATES PATENT AND TRADEMARK OFFICE
CERTIFICATE OF CORRECTION

PATENT NO. : 7,002,958 B1 Page 1 of 1
DATED : February 21, 2008
INVENTOR(S) : Erol Basturk et al.

It is certified that error appears in the above-identified patent and that said Letters Patent is hereby corrected as shown below:

<u>Title page,</u>
Item [75], Inventors, should read
-- Erol Basturk, Cupertino, CA (US)
  Vadim Antonov, Belmont, CA (US) --.

Signed and Sealed this

Thirteenth Day of June, 2006

JON W. DUDAS
*Director of the United States Patent and Trademark Office*

UNITED STATES PATENT AND TRADEMARK OFFICE
CERTIFICATE OF CORRECTION

PATENT NO. : 7,002,958 B1  Page 1 of 1
APPLICATION NO. : 09/393768
DATED : February 21, 2006
INVENTOR(S) : Erol Basturk et al.

It is certified that error appears in the above-identified patent and that said Letters Patent is hereby corrected as shown below:

<u>Title page,</u>
Item [75], Inventors, should read
-- Erol Basturk, Cupertino, CA (US)
   Vadim Antonov, Belmont, CA (US) --.

This certificate supersedes certificate of correction issued June 13, 2006.

Signed and Sealed this

Fifteenth Day of August, 2006

JON W. DUDAS
*Director of the United States Patent and Trademark Office*